Dec. 12, 1967 W. E. FISCHER 3,357,711
ECCENTRICALLY ADJUSTABLE CHUCK
Filed Jan. 5, 1965

INVENTOR
WALTER ERNST FISCHER

BY

ATTORNEYS

United States Patent Office 3,357,711
Patented Dec. 12, 1967

3,357,711
ECCENTRICALLY ADJUSTABLE CHUCK
Walter Ernst Fischer, Junkerweg 5,
Stuttgart-Stammheim, Germany
Filed Jan. 5, 1965, Ser. No. 423,513
5 Claims. (Cl. 279—6)

ABSTRACT OF THE DISCLOSURE

An eccentrically adjustable chuck having a flange for securing the chuck to a machine tool. An outer ring having an eccentric bore positioned in the flange and an inner ring rotatably positioned within the outer ring and also having an eccentric bore. The inner ring has a chuck device mounted within its eccentric bore and a portion of the chuck device extending outwardly beyond the outer face of the ring. The portion of the chuck extending beyond the outer face of the inner ring has a tendency to cause unbalance which is compensated by a number of cavities provided in the inner ring and the chuck device inwardly from the outer face of the inner ring. Additionally, an adjusting screw is provided in the outer ring for securing the inner ring and its chuck device in position.

---

The present invention relates to an eccentrically adjustable chuck intended for the use in machine tools, with the chuck having no disturbing unbalance throughout the entire range of its adjustability.

For fabricating round parts with shoulders, recesses, pivots or journals, bores, etc. arranged eccentrically in elation to the principal axis it has been customary to use various means and facilities, including also eccentrically adjustable chucks. In these types of chucks the eccentric adjustment is either achieved in that the chuck jaws are displaced individually, or in that the portion of the chuck guiding the chuck jaws is displaced by way of swivelling or shifting, relative to the portion mounted to the spindle of the tooling machine.

The Swiss Patent No. 345,220 has already previously proposed an eccentric chuck which can be displaced more easily than the arrangements mentioned heretobefore. The parts additionally required for achieving the easier adjustment or adjustability, however, cause a further unbalance. For removing the unbalance two adjustable rings are provided in this conventional arrangement, with these rings being partly hollow. This arrangement, when employed, calls for a time-consuming setting by trial and error, until finally there is found the proper adjustment. In addition thereto, the partly hollow rings are relatively expensive.

In practice, the conventional solutions to the problem have not proved very satisfactory. They require much time for the adjustment and/or are caused already from the chuck end to have a partly considerable unbalance which, without special measures, often prohibits a tooling or processing, even of light-weight workpieces, at economically reasonable rotational speeds.

These disadvantages are avoided by the novel arrangement to be described hereinafter. The inventive arrangement permits a quick and exact adjustment of the eccentricity without giving rise to a disturbing unbalance caused by the chuck. To this end there are required no special parts.

The present invention relates to an eccentrically adjustable chuck for the use in machine tools or the like, comprising a first ring with an eccentric bore, which is firmly connected to a flange capable of being attached to or fixed on the shaft of a machine tool, in the eccentric bore of which there being a second ring which is rotatable for adjusting the eccentricity and which, in turn, likewise comprises an eccentric bore in which there is seated a chucking means. The invention is characterized by the fact that as a chucking means there is used a three-jaw chuck of the type known per se, and that behind the face side of the closed chuck body, within the rotatable ring, cavities are provided, with the volume of these cavities being equal to the volume of the parts of the three-jaw chuck lying before the face side.

Accordingly, the general idea of the invention resides in the fact that the volume of the (internal) cavities positioned inside the closed chuck body and participating in the eccentric displacement, is equal to the volume of the (external) parts lying outside the closed chuck body and participating in the eccentric displacement.

In order that the invention may be clearly understood, a preferred embodiment will now be described by way of example with reference to the accompanying drawings, in which.

Figure 1:
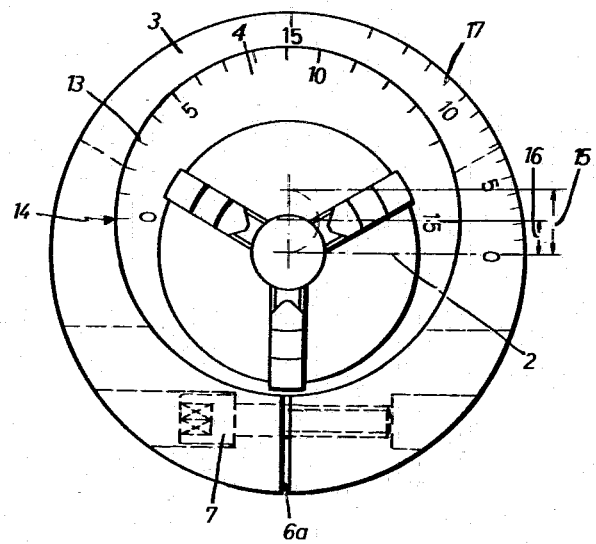
FIG. 1 shows a view in the axial direction of the chuck.
Figure 2:
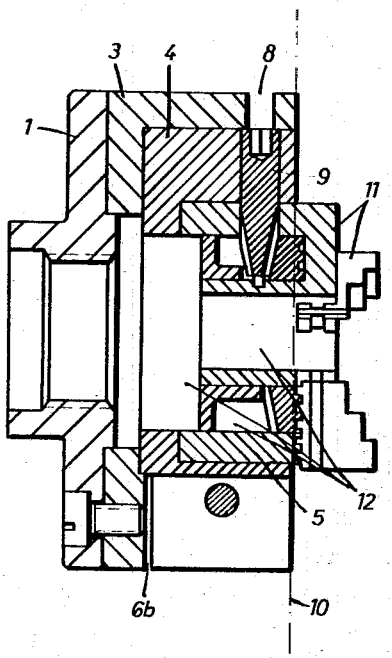
FIG. 2 shows a sectional view of the chuck.

The eccentric adjustment is achieved by the well-known arrangement of two eccentric rings which are guided in one another. As a chucking element there is used a three-jaw chuck of the type known per se. The outer ring 3 as mounted to the flange or shoulder 1 centrally in relation to the main or principal axis 2, is provided with an eccentric groove or recess in which there is tightly seated the three-jaw chucking appliance 5. The eccentricities of rings 3 and 4 are equally large, so that in its normal position the three-jaw chuck will perform its gripping function centrically in relation to the principal axis. The outer ring 3 is provided at its thickest portion with slots 6a and 6b, thus allowing the inner ring 4 to be clamped firmly in position with the aid of screw 7. On the side opposite the slots 6a and 6b the outer ring is provided with an oblong hole 8 lying above the driving pinions 9 of the three-jaw chuck, with these driving pinions, unlike those of conventional design, being partly extended. The oblong hole 8 is so long that at least always one of the driving or adjusting pinions is accessible to the adjusting wrench. The slots 6a and 6b, the bores for the screw 7, and the oblong hole 8 are so dimensioned as not to cause any unbalance with respect to the principal axis. The three-jaw chuck projects to such an extent out of the face side 10 of the rings 3 and 4 as to allow the jaws to be interchanged.

While adjusting the device with respect to its eccentricity an unbalance is caused by the parts 11 projecting over the face side 10. According to the invention the greatest part of this unbalance is compensated in a simple way in that the cavities 12 lying behind the face side 10 and participating in the displacement, are so dimensioned that their volume corresponds to that of the parts 11 of the three-jaw chuck. The remaining, dynamically acting unbalance is due to the fact that the parts 11 causing an unbalance, and the compensating cavities 12 are positioned on different planes transversely in relation to the principal axis. This remaining unbalance may be neglected since it does not call for any speed reduction in practical operation.

For effecting the eccentric adjustment it is necessary to loosen the screw 7. Thereupon the inner ring with the three-jaw chuck may be turned either by hand, or with the aid of the adjusting wrench of the three-jaw chuck engaging one adjusting or driving pinion and acting as a lever. The eccentricity may be adjusted in the manner known per se in accordance with a graduated dial 13 and a zero (0) mark 14. The greatest adjustable eccentricity 15 amounts to double the eccentricity 16 of the rings 3 and 4. This is achieved by effecting a turning by 180°.

For the purpose of fabricating parts which are e.g. supposed to be tooled eccentrically on both face sides, with the two eccentricities having a predetermined angular position, it is necessary to know the angular position of the adjusted eccentricity with respect to the chuck. Therefore, it is possible to provide on the outer ring a graduated dial 17 according to which, with the aid of a centering square and a marking on the workpiece, the latter may be chucked or clamped in a predetermined position.

While I have described above the principles of my invention in connection with specific embodiments, and particular modifications thereof, it is to be clearly understood that this description is made only by way of example and not as a limitation on the scope of my invention as set forth in the objects thereof and in the accompanying claims.

What I claim is:

1. An eccentrically adjustable chuck comprising a flange adapted to mount the chuck on a machine tool, an outer ring having an eccentric bore therethrough positioned in said flange, an inner ring having an eccentric bore therethrough rotatably positionable in the bore of said outer ring, said inner ring having a forward face directed away from said flange, a chucking device secured within the bore of said inner ring and having a portion of its structure extending outwardly from the forward face of said inner ring, and said inner ring and said chucking device forming a plurality of cavities inwardly from the forward face of said inner ring having a volume substantially equal to the volume of said chucking device extending outwardly from the forward face of said inner ring to compensate for the unbalance caused by the portion of the chucking device extending outwardly from the forward face of said inner ring.

2. An eccentrically adjustable chuck as set forth in claim 1, wherein a graduated scale is disposed upon the edge of one of said inner and outer rings contacting the adjacent ring, and a reference mark is located on the other ring for adjusting the eccentricity of the chucking device.

3. An eccentrically adjustable chuck as set forth in claim 1, wherein an adjusting screw is positioned in said outer ring for securely positioning said inner ring therein.

4. An eccentrically adjustable chuck as set forth in claim 1, wherein said chucking device comprises a three jaw chuck.

5. An eccentrically adjustable chuck as set forth in claim 1, wherein a graduated scale is provided on the outer edge of said outer ring for determining the angular position of the workpiece within the chucking device.

References Cited

UNITED STATES PATENTS 2,456,776    12/1948    Faust _____ 279—6

FOREIGN PATENTS 120,507    12/1947    Sweden.
345,220    4/1960    Switzerland.

ROBERT C. RIORDON, *Primary Examiner.*

E. A. CARPENTER, *Assistant Examiner.*